(12) United States Patent  (10) Patent No.: US 7,735,797 B2
Hu  (45) Date of Patent: Jun. 15, 2010

(54) ADJUSTABLE PIVOTING DEVICE FOR A PANEL DISPLAY

(75) Inventor: Chi-Lung Hu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 219 days.

(21) Appl. No.: 12/118,814

(22) Filed: May 12, 2008

(65) Prior Publication Data

US 2009/0278000 A1  Nov. 12, 2009

(51) Int. Cl.
*A47G 29/00* (2006.01)
(52) U.S. Cl. ............... 248/371; 248/372.1; 248/221.11; 248/274.1; 16/340; 16/342; 348/794
(58) Field of Classification Search ................. 248/371, 248/372.1, 393, 394, 395, 396, 397, 398, 248/407, 408, 457, 454, 469, 474, 441.1, 248/220.21, 220.22, 221.11, 222.13, 222.52; 16/340, 342, 343; 361/681, 682, 679.23, 361/679.21; 348/794
See application file for complete search history.

(56) References Cited

U.S. PATENT DOCUMENTS 6,532,628 B2 * 3/2003 Kim ............................. 16/342
6,570,627 B1 * 5/2003 Chang ......................... 348/794
6,899,311 B1 * 5/2005 Ternus ......................... 248/454
7,636,133 B1 * 12/2009 Hsu ............................. 348/794

* cited by examiner

*Primary Examiner*—A. Joseph Wujciak, III
*Assistant Examiner*—Todd M. Epps
(74) *Attorney, Agent, or Firm*—Alan Kamrath; Kamrath & Associates PA

(57) ABSTRACT

An adjustable pivoting device for panel display has a body and a mounting assembly. The body has a controller that is capable of longitudinal movement and two motivating elements that are capable of transversal movement. The controller has actuating slots formed slantwise through the controller. Each motivating element has a latch and an engaging element slidably mounted in one of the actuating slots of the controller, thereby the motivating elements are moved transversely when the controller is moved. The mounting assembly is pivotally mounted with a stand and has two latching elements that rotate simultaneously with the stand and has multiple teeth selectively engage the latches to limit a rotation of the stand. Accordingly, the adjustable pivoting device allows the stand to be adjusted to different positions for freely changing a status or an angle of the panel display and is convenient in use.

7 Claims, 6 Drawing Sheets

ADJUSTABLE PIVOTING DEVICE FOR A PANEL DISPLAY

BACKGROUND OF THE INVENTION

1. Field of the Invention

The present invention relates to an adjustable pivoting device, and more particularly to an adjustable pivoting device for a panel display to allow a stand to be adjusted to different positions for freely changing a status or an angle of the panel display.

2. Description of Related Art

Progression of technology has created various electronic products with multitudes of functions including notebooks, panel displays and smart phones. A panel display may be implemented as a computer monitor, television, digital photo frame, touch panel or the like and is mounted with a stand that supports the weight of the panel display and allows the panel display to be held securely and stably on a determined plane.

However, the conventional stand is securely mounted on the panel display, or alternatively, pivotally mounted on the panel display and pivots between a folding position and a standing position. Thus, people can't adjust the stand to different positions that support the panel display in any determined status or angle. This makes the stands not convenient to use.

SUMMARY OF THE INVENTION

The main objective of the present invention is to provide an adjustable pivoting device for panel display that is mounted on a panel display and allows a stand to be adjusted to different positions for freely changing a status or an angle of the panel display.

To achieve the objective, the adjustable pivoting device for panel display comprises a body and a mounting assembly.

The body is mounted securely on a back of the panel display and has a controller and at least one motivating element. The controller is capable of longitudinal movement relative to the body and has a resilient element and at least one actuating slot. The resilient element is connected between the body and the controller and provides a restoration force to the controller. The actuating slot is slantwise formed through the controller. The motivating element is capable of transversal movement relative to the body and has an inner end, an outer end, an engaging element and a latch. The engaging element is mounted in the inner end of the motivating element and is slidably mounted in the actuating slot of the controller, thereby the motivating element is moved transversely when the controller is moved longitudinally. The latch protrudes from the outer end of the motivating element.

The mounting assembly comprises two mounting tabs and at least one latching element. The mounting tabs are separately mounted on the body and are pivotally mounted with a stand. The at least one latching element rotates simultaneously with the stand, and each has a side edge selectively corresponding to the latch of the motivating element, and multiple teeth protrude from the side edge and selectively engage the latch to limit a rotation of the stand.

When adjusting an angle of the stand, the controller is pulled upward to make the motivating element moving inward and disengaging the latches from the teeth of the latching elements, such that the stand can be pivoted to a determined position.

Accordingly, the adjustable pivoting device in accordance with present invention allows the stand to be adjusted to different positions for freely changing a status or an angle of the panel display and provide convenience in use.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
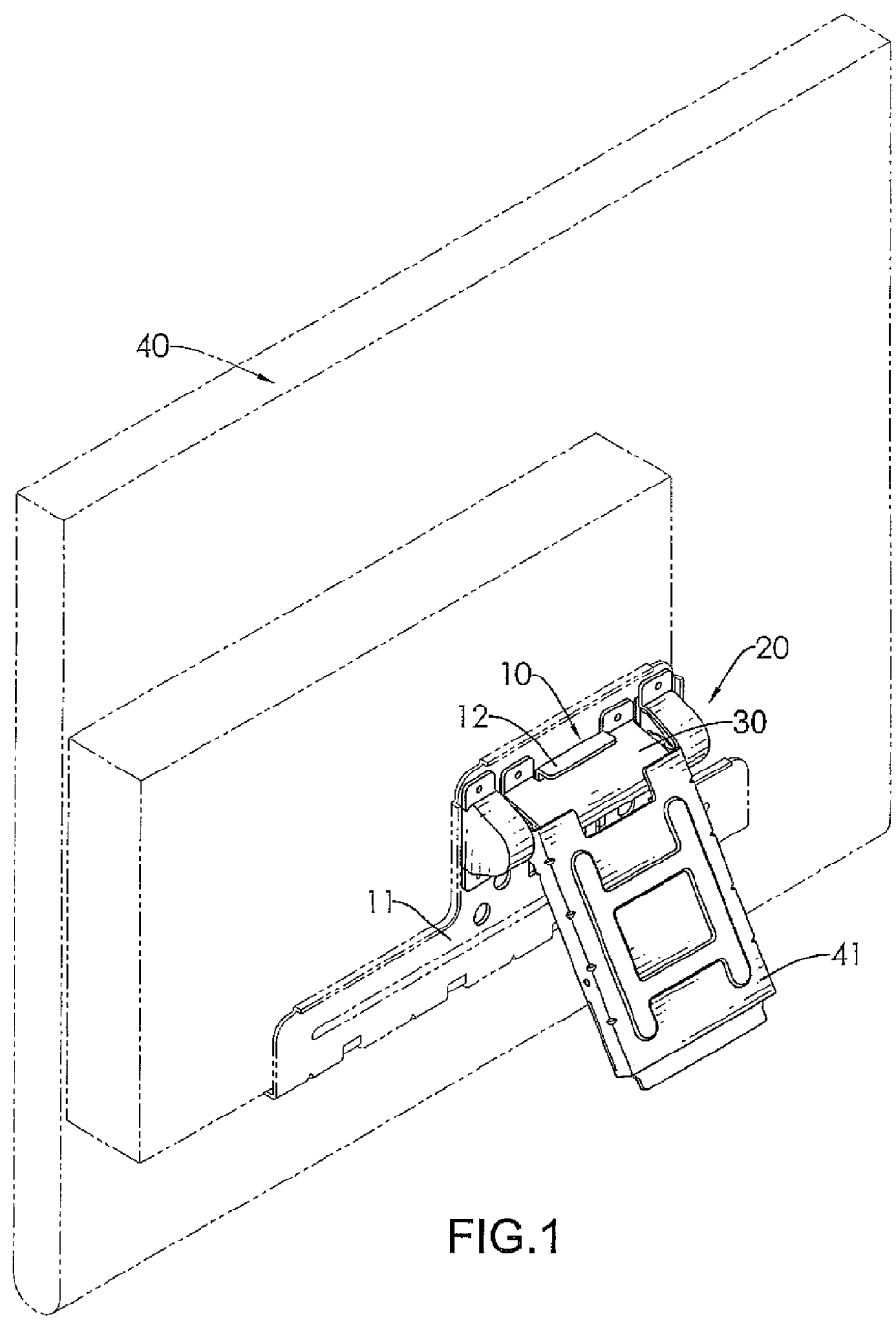
FIG. 1 is a perspective view of an adjustable pivoting device in accordance with the present invention, shown mounted with a panel display.
Figure 2:
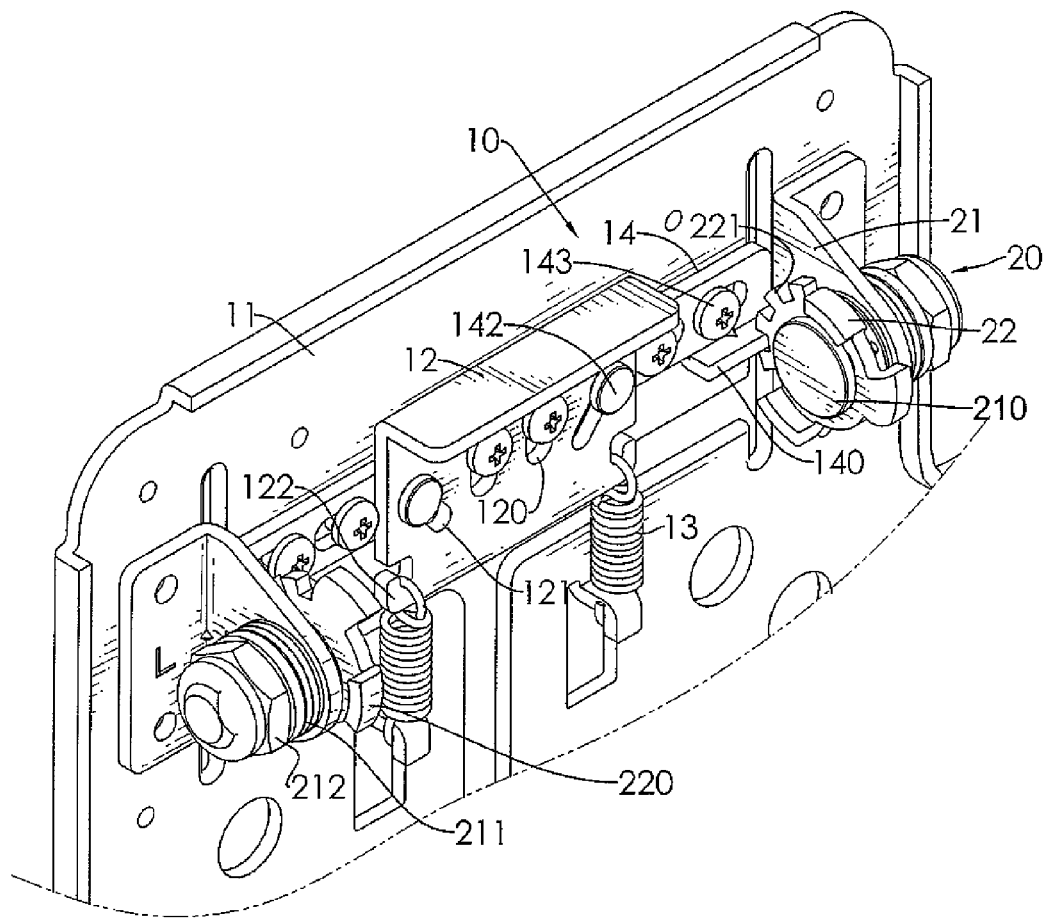
FIG. 2 is an enlarged perspective view of the adjustable pivoting device in FIG. 1.
Figure 3:
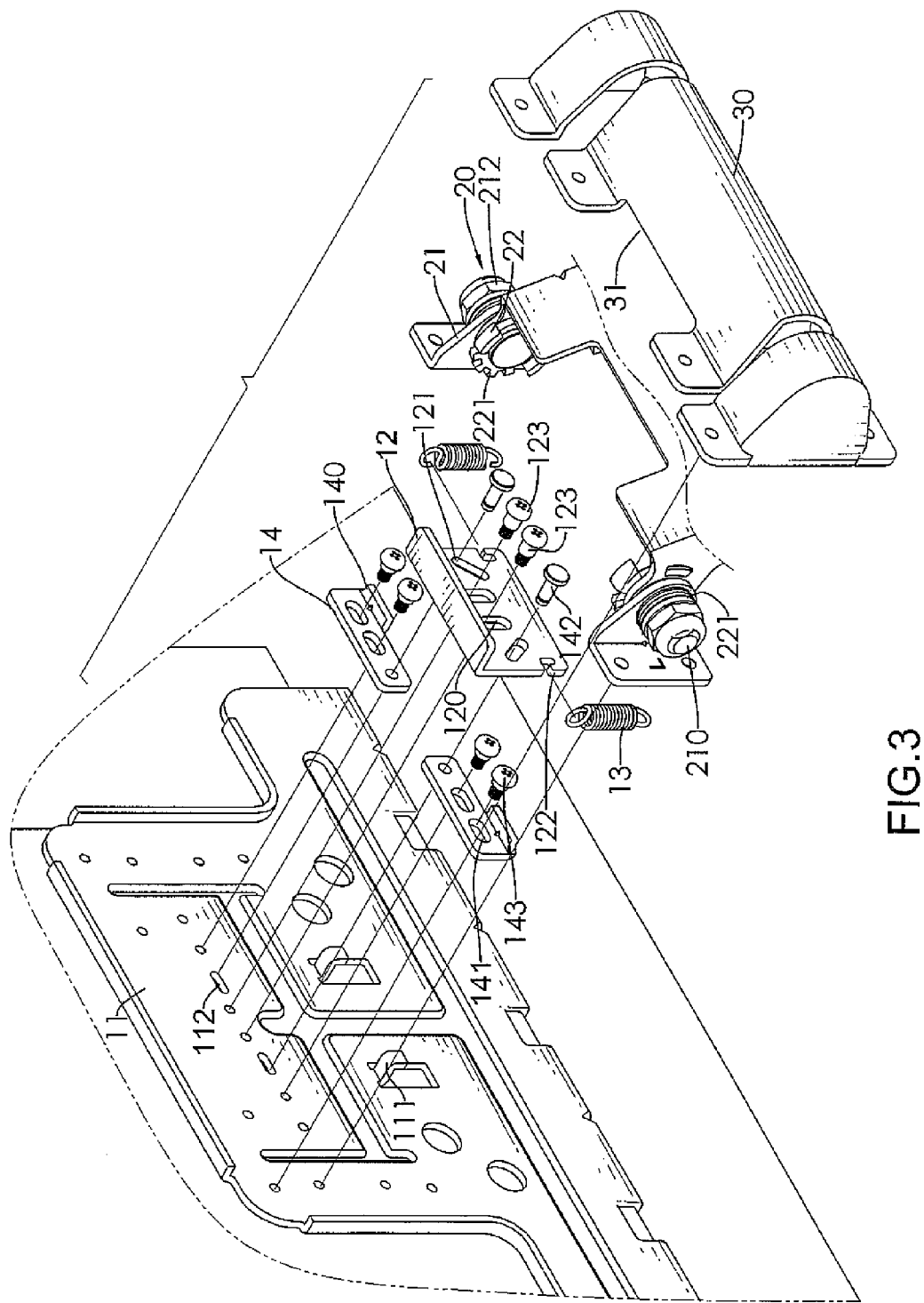
FIG. 3 is an exploded perspective view of the adjustable pivoting device in FIG. 1.
Figure 4:
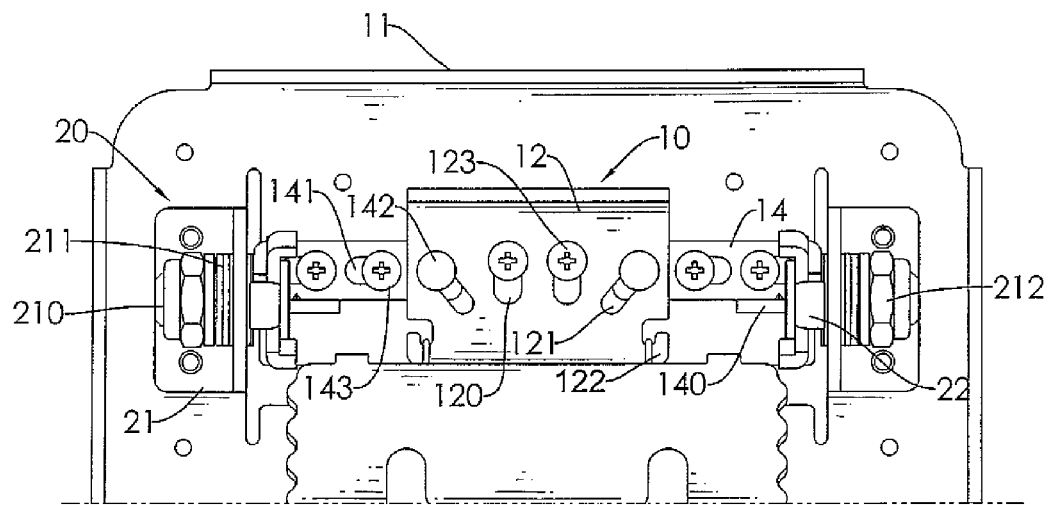
FIG. 4 is an operational side view in partial section of the adjustable pivoting device in FIG. 1, shown fixed.

With reference to FIGS. 1, 2, 3 and 4, The adjustable pivoting device in accordance with present invention is mounted onto a back of a panel display such as a digital photo frame (40) and comprises a body (10), a mounting assembly (20) and a cover (30).

Preferably, the body (10) comprises a mounting bracket (11), a controller (12), two resilient elements (13) and two motivating elements (14).

The mounting bracket (11) is mounted securely on a back of the digital photo frame (40) and has two elongated holes (112) and two hooks (111). The elongated holes (112) are separately formed transversely through the mounting bracket (11). The hooks (111) are separately formed on the mounting bracket (11).

The controller (12) is mounted on the mounting bracket (11), is slidable longitudinally relative to the mounting bracket (11) and has a middle portion, two side portions, multiple longitudinal slots (120), two actuating slots (121), two buckles (122) and multiple fasteners (123). The longitudinal slots (120) are separately formed longitudinally through the middle portion of the controller (12). The actuating slots (121) are slantwise formed respectively through the side portions of the controller (12). The buckles (122) are respectively formed in two sides of the controller (12). The fasteners (123) extend respectively through the longitudinal slots (120) of the controller (12) and secured in the mounting bracket (11), thereby allow a longitudinal slide of the controller (12) relative to the mounting bracket (11).

The resilient elements (13) are connected to two sides of the controller (12), and each resilient element (13) has two ends connects respectively to one of the hooks (111) of the mounting bracket (11) and a corresponding one of the buckles (122) of the controller (12), thereby provides a restoration force to the controller (12).

Figure 5:
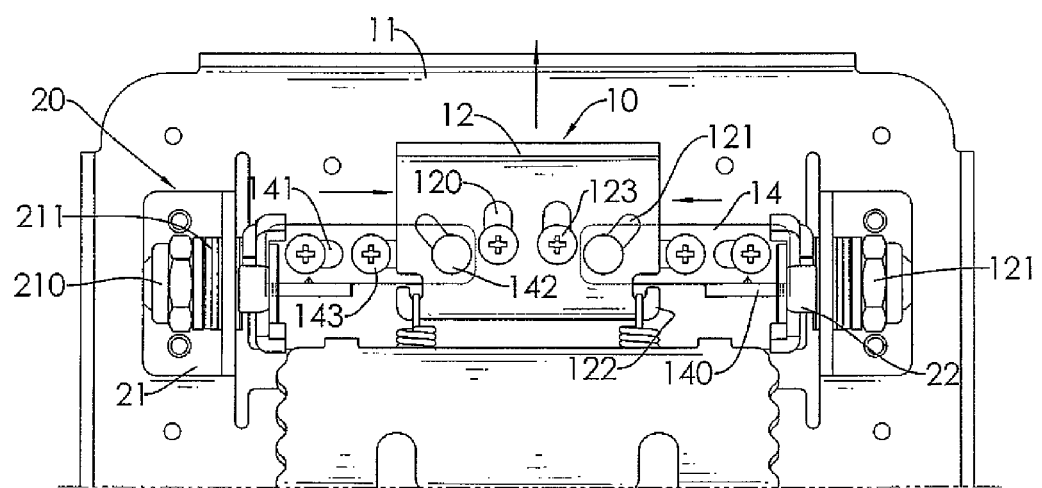
FIG. 5 is an operational side view in partial section of the adjustable pivoting device in FIG. 1, shown pivoting.

The motivating elements (14) are transversely mounted oppositely on the mounting bracket (11) beside the controller (12) and are transversely slidable relative to the mounting bracket (11). Each motivating element (14) has an inner end, an outer end, multiple transversal slots (141), multiple bolts (143), an engaging element (142) and a latch (140). The transversal slots (141) are separately formed transversely through the motivating element (14). The bolts (143) extend respectively through the transversal slots (141) of the motivating element (14) and are secured in the mounting bracket (11), thereby allow a transversal slide of the motivating element (14) relative to the mounting bracket (11). The engaging element (142) slidably extends through a corresponding actuating slot (121) of the controller (12), is secured in the inner end of the motivating element (14) and is slidably mounted through a corresponding elongated hole (112) of the mounting bracket (11). Accordingly, the motivating element (14) is moved inward when the controller (12) moves upward as shown in FIG. 5. The latch (140) protrudes from the outer end of the motivating element (14).

Figure 6:
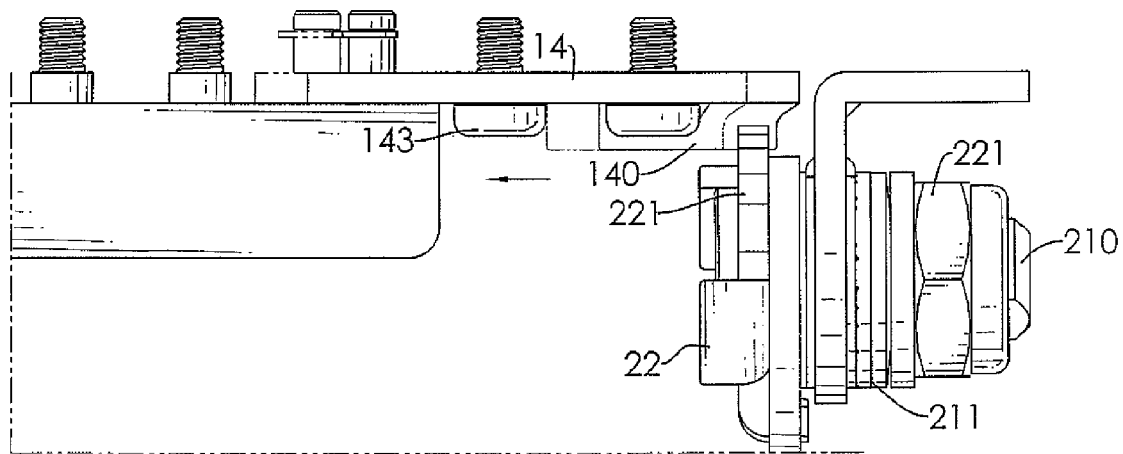
FIG. 6 is an operational top view of the adjustable pivoting device, shown engaged.

The mounting assembly (20) comprises two mounting tabs (21), two pintles (210) and two latching elements (22). The mounting tabs (21) are separately mounted on the body (10) and are pivotally mounted with a stand (41). The pintles (210) are rotatably mounted respectively through the mounting tabs (21), and each pintle (210) is mounted around by multiple spacers (211) and is secured by a fixing element (212). The latching elements (22) are respectively mounted around the pintles (210), and each latching element (22) has a boss (220), a side edge and multiple teeth (221). The boss (220) is secured in a surface of the stand (41) to make the latching element (22) rotates simultaneously with the stand (41). The side edge selectively corresponds to the latch (140) of the motivating element (14). The teeth (221) protrude from the side edge of the latching element (22), and each two adjacent teeth (221) define a gap that selectively engage the corresponding latch (140) to limit a rotation of the latching element (22) and the stand (41) as shown in FIG. 6.

The cover (30) is detachably mounted on the mounting bracket (11) to cover the body (10) and the mounting assembly (20) and has a top and a notch (31) formed on the top. The notch (31) corresponds to and allows the controller (12) to protrude out from the notch (31), thus facilitates an operation of the controller (12).

Figure 7:
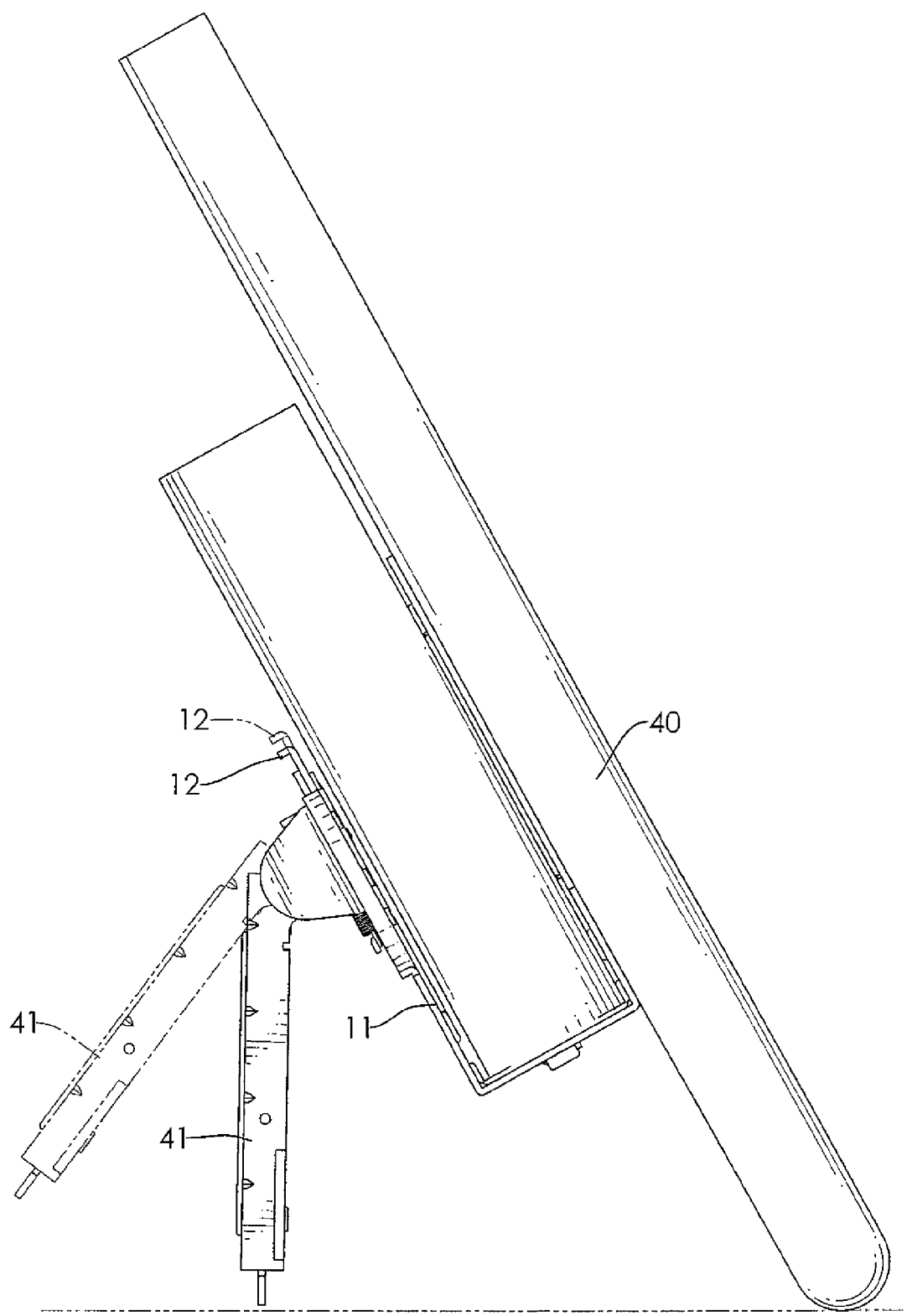
FIG. 7 is an operational side view of the adjustable pivoting device, shown pivoted.

With further reference to FIG. 7, when adjusting an angle of the stand (41), the controller (12) is pulled upward to make the motivating element (14) move inward and disengages the latches (140) from the teeth (221) of the latching elements (22), and the stand (41) can be rotated to a determined position. Then, the controller (12) is released and the latches (140) and the teeth (221) will reengage with each other via the restoration force provided by the resilient elements (13).

Accordingly, the adjustable pivoting device in accordance with present invention allows the stand (41) to be adjusted to different positions for freely changing a status or an angle of the panel display and is convenient in use.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. An adjustable pivoting device for being pivotally mounted a stand on a back of a panel display and comprising
   a body comprising
      a mounting bracket;
      a controller being mounted on the mounting bracket, being longitudinally slidable relative to the mounting bracket and having
         a middle portion; and
         at least one actuating slot being slantwise formed through the controller;
      at least one resilient element having two ends connecting respectively to the mounting bracket and the controller; and
      at least one motivating element being transversely mounted on the mounting bracket, being transversely slidable relative to the mounting bracket and having
         an inner end;
         an outer end;
         an engaging element secured in the inner end of the motivating element and being slidably mounted through a corresponding actuating slot of the controller; and
         a latch protruding from the outer end of the motivating element; and
   a mounting assembly comprising
      two mounting tabs being separately mounted on the body;
      two pintles being rotatably mounted respectively through the mounting tabs for pivotally mounting the stand with the mounting tabs; and
      at least one latching element being respectively mounted around at least one of the pintles and each one of the at least one latching element having
         a boss being adapted to be secured in a surface of the stand to make the latching element rotating simultaneously with the stand;
         a side edge selectively corresponding to the latch of a corresponding one of the at least one motivating element; and
         multiple teeth protruding from the side edge of the latching element, and each two adjacent teeth defining a gap that selectively engages the latch on the corresponding motivating element to limit a rotation of the latching element and the stand.

2. The adjustable pivoting device as claimed in claim 1, wherein
   the controller of the body has two actuating slots being slantwise formed respectively through two side portions of the controller;
   the body has two motivating elements being transversely mounted oppositely on the mounting bracket and corresponding respectively to the actuating slots of the controller; and
   the mounting assembly has two latching elements being respectively mounted around the pintles.

3. The adjustable pivoting device as claimed in claim 2, wherein
   the mounting bracket of the body further has two hooks being separately formed on the mounting bracket;
   the controller further has two buckles being respectively formed in two sides of the controller; and
   the body has two resilient elements each having two ends connecting respectively to one of the hooks of the mounting bracket and a corresponding one of the buckles of the controller.

4. The adjustable pivoting device as claimed in claim 1, wherein the controller further has
   multiple longitudinal slots being separately formed longitudinally through the middle portion of the controller; and
   multiple fasteners extending respectively through the longitudinal slots of the controller and secured in the mounting bracket.

5. The adjustable pivoting device as claimed in claim 1, wherein each one of the at least one motivating element further has
- multiple transversal slots being separately formed transversely through the motivating element; and
- multiple bolts extending respectively through the transversal slots of the motivating element and secured in the mounting bracket.

6. The adjustable pivoting device as claimed in claim 1, wherein each pintle of the mounting assembly is mounted around by multiple spacers and is secured by a fixing element.

7. The adjustable pivoting device as claimed in claim 1 further comprises a cover being detachably mounted on the mounting bracket to cover the body and the mounting assembly and having
- a top; and
- a notch formed on the top and corresponding to and allowing the controller of the body to protrude out of the notch.

* * * * *